(12) United States Patent
Lindbo

(10) Patent No.: US 11,488,193 B2
(45) Date of Patent: Nov. 1, 2022

(54) METHOD AND SYSTEM FOR OPERATING A STORAGE FACILITY

(71) Applicant: OCADO INNOVATION LIMITED, Hertfordshire (GB)

(72) Inventor: Lars Sverker Ture Lindbo, Hertfordshire (GB)

(73) Assignee: OCADO INNOVATION LIMITED, Hertfordshire (GB)

(*) Notice: Subject to any disclaimer, the term of this patent is extended or adjusted under 35 U.S.C. 154(b) by 0 days.

(21) Appl. No.: 15/038,250

(22) PCT Filed: Nov. 24, 2014

(86) PCT No.: PCT/EP2014/075442
§ 371 (c)(1),
(2) Date: May 20, 2016

(87) PCT Pub. No.: WO2015/075250
PCT Pub. Date: May 28, 2015

(65) Prior Publication Data
US 2016/0292709 A1    Oct. 6, 2016

(30) Foreign Application Priority Data
Nov. 25, 2013    (GB) .................................... 1320758

(51) Int. Cl.
*G06Q 30/02* (2012.01)
*G06Q 30/06* (2012.01)

(52) U.S. Cl.
CPC ..... *G06Q 30/0234* (2013.01); *G06Q 30/0207* (2013.01); *G06Q 30/0613* (2013.01)

(58) Field of Classification Search
None
See application file for complete search history.

(56) References Cited

U.S. PATENT DOCUMENTS

| 7,475,912 B1 * | 1/2009 | Reffett | ...................... B32B 7/06 |
| | | | 283/105 |
| 2001/0042024 A1 * | 11/2001 | Rogers | ............... G06Q 10/0637 |
| | | | 705/26.81 |

(Continued)

FOREIGN PATENT DOCUMENTS

WO    WO-03056490 A1 *    7/2003    ............. G06Q 10/08

OTHER PUBLICATIONS

U-Haul, "U-Haul Continues to Offer 30 Days Free Self-Storage and U-Box Moving and Self-Storage Containers to Assist Hurricane Sandy Victims," retrieved from https://www.uhaul.com/Articles/About/1093/U-Haul-Continues-To-Offer-30-Days-Free-Self-Storage-And-U-Box-Pod-Moving-And-Self-St, (Year: 2012).*

(Continued)

*Primary Examiner* — Sam Refai
(74) *Attorney, Agent, or Firm* — Buchanan Ingersoll & Rooney PC

(57) ABSTRACT

Systems, methods, and machine-readable instruction sets, configured for delivering, to one or more secure storage facilities operated by or on behalf of, or otherwise associated with, a first enterprise, and located at a premises owned, leased, operated by or on behalf of, and/or otherwise associated with, a second enterprise, such as a conveniently-located vendor premises engaged in selling unrelated goods or services, goods associated with an order placed with the first enterprise via a communications network; and delivering, to a resource identifier associated with the order, signals representing value, such as coupon(s), loyalty and/or other discount points, etc., redeemable at the second enterprise, and/or at a third-party premises.

18 Claims, 5 Drawing Sheets

(56) References Cited

U.S. PATENT DOCUMENTS

| | | | |
|---|---|---|---|
| 2001/0054275 A1 | 12/2001 | Tiley et al. | |
| 2003/0037515 A1* | 2/2003 | Herzog | B65B 5/105 53/473 |
| 2011/0042024 A1* | 2/2011 | Ruthven | D21F 11/14 162/114 |
| 2011/0264259 A1* | 10/2011 | Boyer | B25J 9/042 700/218 |
| 2012/0150653 A1* | 6/2012 | Bennett | G06Q 30/0605 705/14.58 |
| 2013/0268335 A1* | 10/2013 | Cooper | G06Q 30/0217 705/14.19 |
| 2013/0304561 A1* | 11/2013 | Warner | G06Q 30/0233 705/14.27 |

OTHER PUBLICATIONS

G. John Cook, "Photos: A look at Amazon's new delivery locker at 7-Eleven", retrieved from https://www.geekwire.com/2011/confirmed-amazons-delivery-locker-7eleven/, available on Sep. 5, 2011 (Year: 2011).*

International Search Report (PCT/ISA/210) dated Mar. 4, 2015, by the European Patent Office as the International Searching Authority for International Application No. PCT/EP2014/075442.

Written Opinion (PCT/ISA/237) dated Mar. 4, 2015, by the European Patent Office as the International Searching Authority for International Application No. PCT/EP2014/075442.

* cited by examiner

METHOD AND SYSTEM FOR OPERATING A STORAGE FACILITY

FIELD

The present disclosure related to the field of storage and delivery facilities, and particularly to methods and systems for operating storage facilities.

BACKGROUND DISCUSSION

The delivery of goods is a part of online sales that can involve unnecessary delays, theft, misplaced goods, unsuccessful delivery attempts, and added waste and expense. For these and other reasons, some merchants and consumers are turning to the use of centralized storage facilities. The use of such storage facilities can, for example, reduce the cost of delivery, misplaced goods and delays. For example, secure lockers can be used as a final stage in a "click and collect" online sales and delivery system, in which groceries and/or other goods are ordered on-line by the recipient (i.e.: the "click" portion) and are delivered to a nearby or otherwise convenient bank of automated or semi-automated secure lockers, where the recipient can "collect" the goods at their convenience.

Among the many challenges faced by operators, and putative operators, of centralized storage facilities are the costs, space and/or time expended by the enterprise hosting the secure storage facilities, or by the enterprise operating the storage facilities may discourage the use of such storage facilities.

There remains a need for improvement in many aspects of the operation of storage facilities at host locations.

SUMMARY

In various aspects, the invention provides systems and methods for operation of storage facility(ies) useful in the delivery of goods, such as groceries and other consumer items, for secure and convenient pick-up by customers who have ordered them remotely, and/or in advance.

In various embodiments, methods in accordance with the invention comprise delivering, to one or more secure storage facilities operated by or on behalf of, or otherwise associated with, a first enterprise, and located at a premises owned, leased, operated by or on behalf of, and/or otherwise associated with, a second enterprise, such as a conveniently-located vendor premises engaged in selling unrelated goods or services, goods associated with an order placed with the first enterprise by means of a communications network; and delivering, to a resource identifier associated with the order, signals representing value, such as coupon(s), loyalty and/or other discount points, etc., redeemable at the second enterprise, and/or at a third-party premises.

Signals representing value provided to customers may be evidenced in any of a very wide range of suitable fashions, including for example through the use of paper or other durable coupons printed at the pickup site, or delivered with the goods; virtual coupons delivered to a customer's smart phone, other mobile device, and or home desktop computer; and/or points or other value delivered by association with and addition to new or previously existing rewards accounts administered by either of the vendors, or by one or more third parties.

In the same and other embodiments, the invention includes realization by the first enterprise, directly or indirectly, from the second enterprise of consideration, such as reduced lease payments, reciprocal value awards to customers, and/or other promotions, for delivery to the resource identifier of the signals representing value redeemable by the second enterprise.

In further aspects, the invention provides processors and other system components, including for example communications devices and networks, configured for implementing such methods.

In further aspects, the invention provides computer-readable and -executable instruction sets suitable for use in implementing such methods.

In order that the invention may be readily understood, embodiments of the invention are illustrated by way of example in the accompanying drawings, in which like reference numbers indicate like components or steps.

Figure 1:
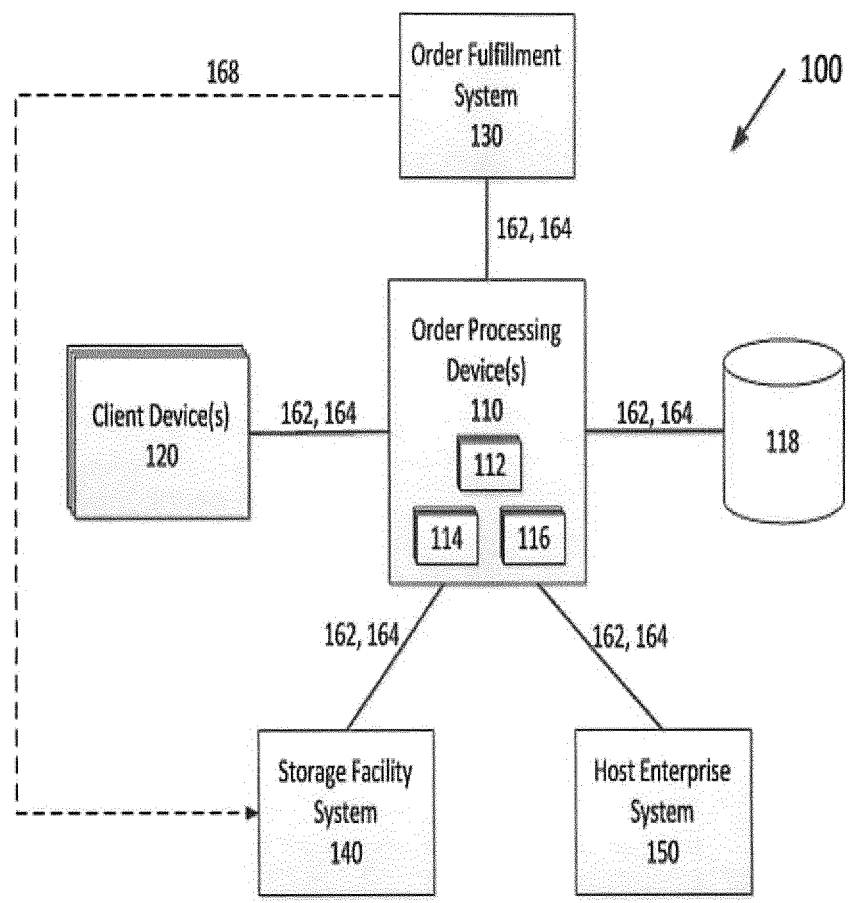
FIG. 1 is a schematic diagram of an example system in accordance with various aspects of the disclosure.

Further details of the invention and its advantages will be apparent from the detailed description included below.

DETAILED DESCRIPTION

Storage facilities such as locker systems, privately-operated post office boxes, or other secure storage facilities can be used to securely store deliveries of items until they are retrieved by a recipient. Such storage facilities may be automated or semi-automated, and/or may be attended by an attendant who can, for example, manually retrieve a delivery from a secure storage area upon request by a recipient.

In accordance with various aspects and embodiments of the invention, such storage facilities or portions of the storage facilities can be operated by or on behalf of a first enterprise while being located at the premises associated with a second enterprise. For example, the first enterprise may be a merchant, distributor/wholesaler or delivery entity operating as part of or on behalf of an online, telephone, and/or catalogue shopping service. In various instances, the first enterprise may be one of multiple enterprises sharing one or more storage facilities. For example, multiple online merchants could share the same storage facility.

The storage facilities may be located at premises associated with a second, or host, enterprise, which as an entity is generally not related, or not directly related, to the enterprise on behalf of which the facility is to be operated. For example, a storage facility may be located on the premises associated with gas stations, libraries, parking lots, banks, retail stores, office buildings, shopping malls, public transport facilities (e.g. bus, train or subway stations), post offices, community centres, schools or any other suitable location. In general, such a second, or host, enterprise will be subject to separate accounting and book-keeping procedures.

In various embodiments the second or host enterprise, can lease space to host the storage facilities associated with the first enterprise(s), or can lease the actual storage facilities to the first enterprise(s). Such space may be provided in any suitable indoor and/or outdoor location(s) on the host premises.

In various embodiments methods of operating storage facilities in accordance with the invention may help to offset and/or otherwise adjust lease and/or other operating costs, such as utilities (e.g., electric, gas, water) costs, and/or may operate to encourage storage facility clients to patronize the second enterprise. In some scenarios, for example, the lease costs to the first enterprise(s) may be expensive, or the lease revenue to the second enterprise may not be enough to justify the inconvenience of dealing with customer inquiries or problems. In other embodiments, the offering of coupons, discounts, and/or other inducements to users of the facilities (e.g., customers of the enterprise on behalf of which the facilities are operated) can be used to encourage such users to both use the facilities and/or patronize an operator or other occupant of the host premises.

FIG. 1 shows an example system 100 suitable for implementing aspects of order processing and delivery in accordance with the invention. In the example embodiment shown, system 100 includes one or more order processing devices 110 associated with an online, telephone, mail, and/or other in-person or remote order shopping system; one or more secure storage facilities 140, one or more client devices 120, one or more order fulfillment systems 130, optional host enterprise system(s) 150, and database(s) 118.

Order processing device(s) 110 can include any one or more of servers, general purpose computers, local and/or mobile computing devices, control systems, or any other suitable devices suitable for use in implementing system(s) and/or method(s) in accordance with this disclosure. Such device(s) 110 can, for example, be implemented as centrally-operated enterprise servers, and/or as locally-implemented kiosk(s) or control devices at storage facilities such as those described herein.

An order processing device 110 suitable for use in implementing the invention can include any one or more processor(s) 112, memory(ies) 114 and/or communication module(s)s 116 configured to perform the methods and operations described herein. Such order processing device(s) 110 can be configured to receive and process data and/or other signals representing order(s) placed with the first enterprise. Order item information, value information, first enterprise information, second enterprise information, or any other information pertinent to the system 100 may be stored in one or more datastores 118 at one or more of the order processing device(s) 110 or otherwise accessible to the order processing device(s) 110 via one or more communication networks 162, 164 or otherwise.

Communications means suitable for use in implementing systems in accordance with the invention can include any combination(s) of public 162 or private 164 networks and/or other communications devices or components. In some examples, the communications network(s) 162, 164 can include any combination of wired, wireless or other networks and may span any desired and/or otherwise suitable number of service providers.

Signals representing order(s) can, in some examples, be received at the order processing device(s) 110 from one or more client device(s) 120 via one or more communication networks 162, 164. Client device(s) 120 can include any of a very wide variety of signal processing and communications devices, including for example any suitably-configured general purpose computers, mobile computing devices, servers, automated or semi-automated telephone systems, order terminals, or other suitable devices. For example, a customer may use a personal computer or smartphone to access and place an order via an online shopping website. Signals representing the order or order data, or information, can be sent to the order processing device(s) directly from the client device used by the customer (e.g. personal computer or smartphone) or from a client device (e.g. server) hosting the shopping website. In some examples, the order processing device(s) 110 may host the shopping website.

As another example, a customer may place an order via a client device such as a voice telephone. For example, an automated or semi-automated telephone service hosted at a client device (e.g. telephone server) or an order processing device 110, may receive order information from a client device (e.g. telephone) used by the customer by way of a series of (semi-)automated menus and touch-tone inputs.

As another example, a customer may place an order via a representative of the first enterprise. For example, a customer may call a telephone sales representative, talk to a sales representative in person at a brick-and-mortar store or send an order via postal mail which is reviewed by a representative of the first enterprise. Based on any of these or other interactions, the first enterprise representative may input order information on a client device 120 for sending to the order processing device(s) 110.

As another example, a customer may place an order via a client device 120 such as an electronic/computer terminal at a brick-and-mortar store or secure storage facility associated with the first enterprise, a kiosk in a shopping center, or any other location.

Order processing device(s) 110 can, in various examples, be configured to send signals representing order information and/or value data corresponding to value redeemable at the first enterprise, at the host or second enterprise, and/or to any desired one or more third-party enterprises not physically or otherwise involved in the provision of facility(ies) 140 and/or order fulfillment processes 130.

Order processing device(s) 110 can, in various examples, be configured to generate signals useful in fulfilling order(s), which can, for example, be sent to one or more order fulfillment systems 130. In some examples, the order fulfillment system 130 can include one or more automated, semi-automated, and/or manual storage-and-retrieval systems for storing/warehousing goods until they are retrieved or picked to fulfill an order. Order picking in an order fulfillment system 130 can, in some examples, be automated or semi-automated wherein robotics and/or electronic devices retrieve and prepare goods for delivery, or retrieve and transport goods to a picking station for picking by picking personnel. In other examples, order picking can be performed by personnel retrieving goods from storage locations manually, with the aid of devices such as forklifts, or otherwise. In some examples, an order fulfillment system 130, can include an automated, semi-automated or manual delivery system wherein ordered goods are packaged, labelled, and prepared for or otherwise delivered to the order recipient.

Order fulfillment system(s) 130 can, in various examples, include one or more electronic devices, such as computing devices, mobile devices, control systems, and the like, configured to receive order information from the order processing device(s) 110. In further examples, the order fulfillment system 130 can include printers, displays, computer terminals, mobile devices, or other electronic devices for providing order information and/or value data, including for example coupons and other evidence of discounts, rewards, etc., for picking and/or delivering with an order.

While order processing device(s) 110 and order fulfillment system(s) 130 are displayed in the example system 100 in FIG. 1 as separate blocks, in various examples, the order processing device(s) 110 can be part of the order fulfillment system 130, or aspects of the order fulfillment system 130 may be included with the order processing device(s) 110. Any other physical or logical divisions or combinations consistent with the purposes described herein can also be used.

Order processing device(s) 110 can, in various examples, be configured to generate signals useful for delivering order(s) via the order fulfillment system 130 or through any other suitable or otherwise desirable means. When, for example, data or other information associated with an order indicates that the order is to be delivered to a secure storage facility 140, responsible order processing device(s) 110 may be configured to send signals to the storage facility system 140 representing order information, access information, value data or any other data or commands via the communication network 162, 164 or otherwise.

In various examples, storage facility system(s) 140, which are optionally secure facilities, can include locker systems, post office boxes, or other automated, semi-automated and/or personnel-attended storage facilities. Such storage facilities may be located at, or otherwise associated, with premises controlled, monitored and/or otherwise associated with one or more second enterprises. Storage facilities 140 may, for example, be secure in the sense that orders stored at the facilities cannot generally be accessed by individuals or entities lacking suitable authorization.

In various examples, storage facility(ies) 140 can include a (semi-)automated locker system(s) which can be opened by an order recipient, upon provision of one or more authentication factors, which authentication factors may be of any type(s) consistent with the purposes disclosed herein.

In further examples, storage facility(ies) 140 can include one more manned pick-up locations, wherein upon authenticating a recipient, an attendant retrieves an order from a secure area such as a backroom, locker or other area inaccessible to the recipient.

Storage facility system(s) 140 can, in various examples, include systems, devices, or components suitable for communicating or otherwise providing evidence of order, value, reward, discount, or other information to customers and/or other users, including for example one or more of any or all of suitably-configured printers, displays, computer terminals, mobile devices, and other devices for communicating such information to users.

Further description of embodiments of storage facility(ies) 140 is provided below.

In various embodiments, system(s) 100 in accordance with the invention can further include server(s) or other system(s) 150 operated by, or on behalf of, and/or otherwise associated with hosts or other enterprises associated with the premises at which facility(ies) 140 are located. Such systems 150 can, for example, be configured to exchange data with order processing system(s) 110 so as to receive from system(s) 110 signals authorizing and/or otherwise representing discounts and/or other value to be passed on to customers, order processing entities, etc. Such exchanged data may, for example, be used to generate, validate, track or otherwise facilitate an object or signal representing value redeemable at or by the second enterprise, or host.

As indicated at 168, goods ordered by a customer using a client device 120 in communication with an order processing system 110 can be filled by order fulfillment system 130 by means of physical transfer of the ordered goods from the fulfillment system 130 to one or more storage facility(ies) 140. For example, direct or indirect delivery incorporating means such as postal, courier, and/or dedicated delivery means such as vehicles and/or personnel may be used for deliver purposes.

Figure 2:
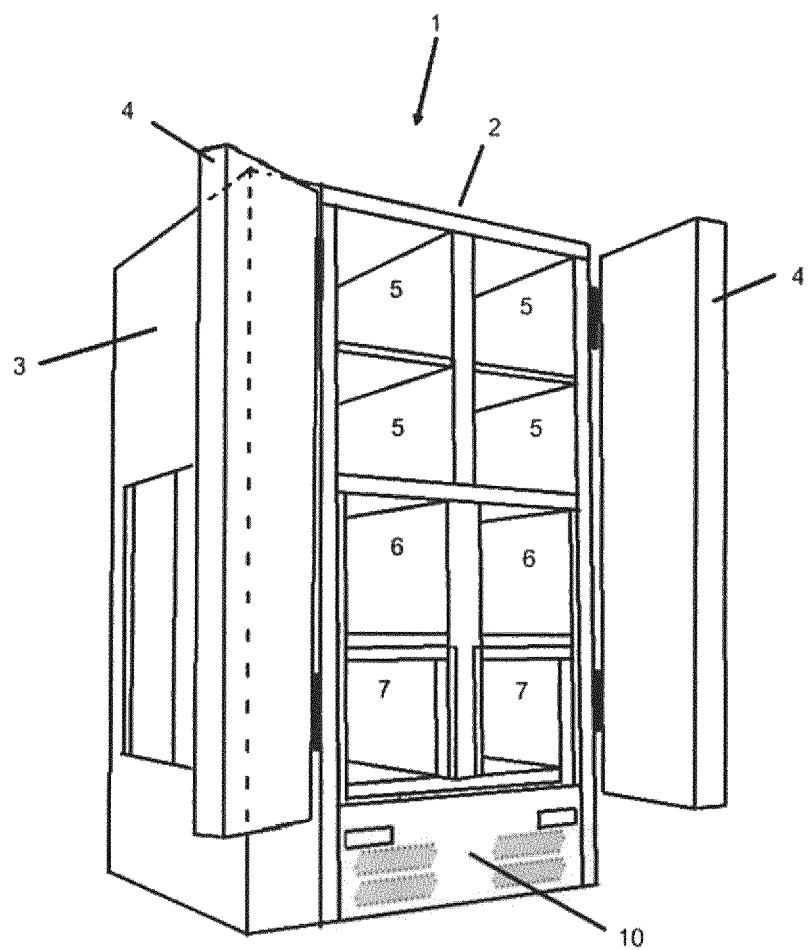
FIG. 2 is a front left side view of a double door locker with two columns of four compartments, each column being sealed by a single door, an access control unit mounted to the left side and a removable environmental control unit slidably housed below the compartments.

FIG. 2 illustrates a locker 1 configured for unattended storage and automated access/delivery of stored goods (not shown) within compartments. Locker 1 is suitable for use in, for example, implementing various embodiments of storage facility system(s) 140. In the embodiment shown, locker 1 comprises a locker housing 2 which can, for example, be constructed as a weatherproof sealable box or frame with weatherproof sheet metal cladding and lockable insulated doors 4. In FIG. 1, a single rectangular locker housing 2 is shown with two doors 4 and a single access control unit 3 mounted to the left side of the locker housing 2.

Figure 3:
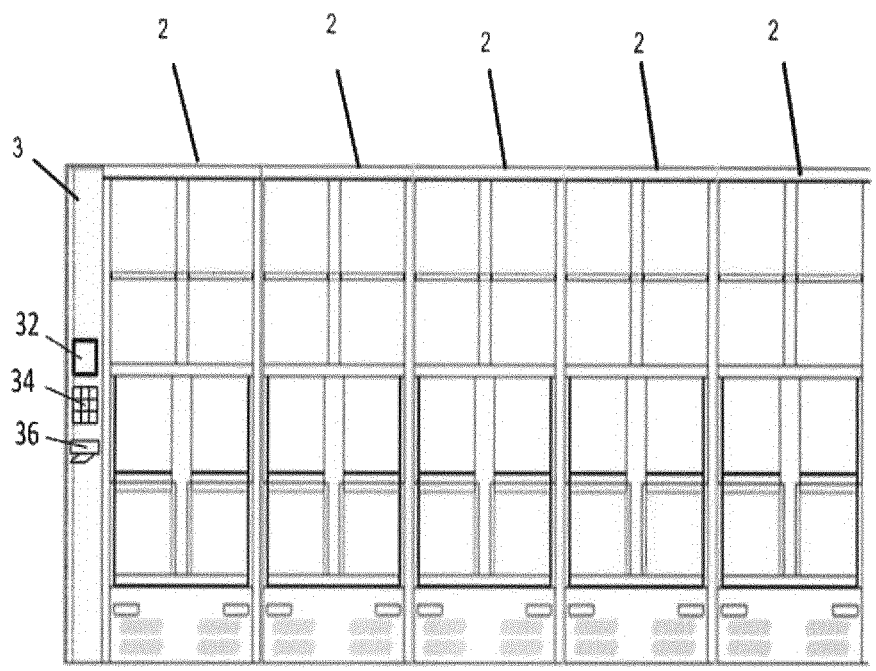
FIG. 3 is an elevation view of a bank, or array, of five double-door lockers joined together, with doors removed for clarity, where each locker has two columns of four compartments, an access control unit mounted to the left side of the array and a removable environmental control unit slidably housed below the compartments.

FIG. 3 shows an alternative array of five locker housings 2, which may for example be identical, with doors 4 removed for clarity, and a single access control unit 3 mounted to the left side of the leftmost locker housing 2. The locker housings 2 and access control units 3 are preferably manufactured separately as modules and can suit various installed arrangements. Alternatives that are not illustrated include: installing the access control unit 3 separately indoors and communicating wirelessly or with a hard wired connection with the locker housings 2; positioning the access control unit 3 in the middle of multiple locker housings 2; and positioning the access control unit 3 on the top surface of multiple locker housings 2.

In the embodiments shown, locker housings 2 each, comprise two columns, each column comprising four compartments 5, 6, 7, and 8 with doors 4 that sealingly cover each column. In the illustrated embodiments, four ambient compartments 5, two refrigerated compartments 6 and two freezer compartments 7 are provided, each having a front access opening to insert and remove goods. It will be understood that the any configuration can be provided depending on the needs of an installation.

Door(s) 4 sealingly engage each access opening, and may be thermally insulated when intended to cover thermally insulated refrigerated and freezer compartments such as 6 and 7. An automated latch (not shown) engages the door and is movable between a locked position and an unlocked position when a lock/unlock signal is communicated from the access control unit 3.

Various embodiments of operations of the access control unit 3 and automated doors 4 suitable for use in implementing the invention are considered to be within the knowledge of the relevant art, and therefore are not described in detail herein.

As noted above, and shown for example in FIG. 3, storage facility system(s) 140 suitable for use in implementing the invention can include one or more displays 32, input devices such as a keypad 34, or printing devices 36. Such devices can be located at, or in other, preferably convenient association with, any storage facility such as a locker system as illustrated in FIG. 3, at a manned storage facility such as a post-office, or any other storage facility.

Figures 4A, 4B:
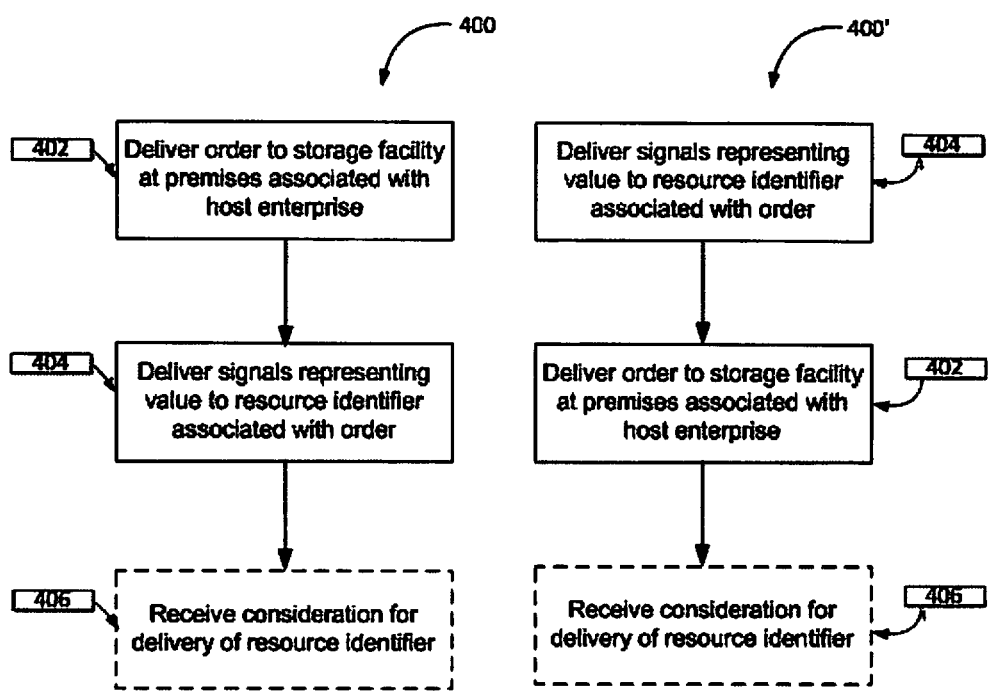
FIGS. 4A, 4B, and 5 are schematic diagrams showing process flows associated with embodiments of methods of operating storage facilities for the delivery of goods in accordance with the invention.
Figure 5:
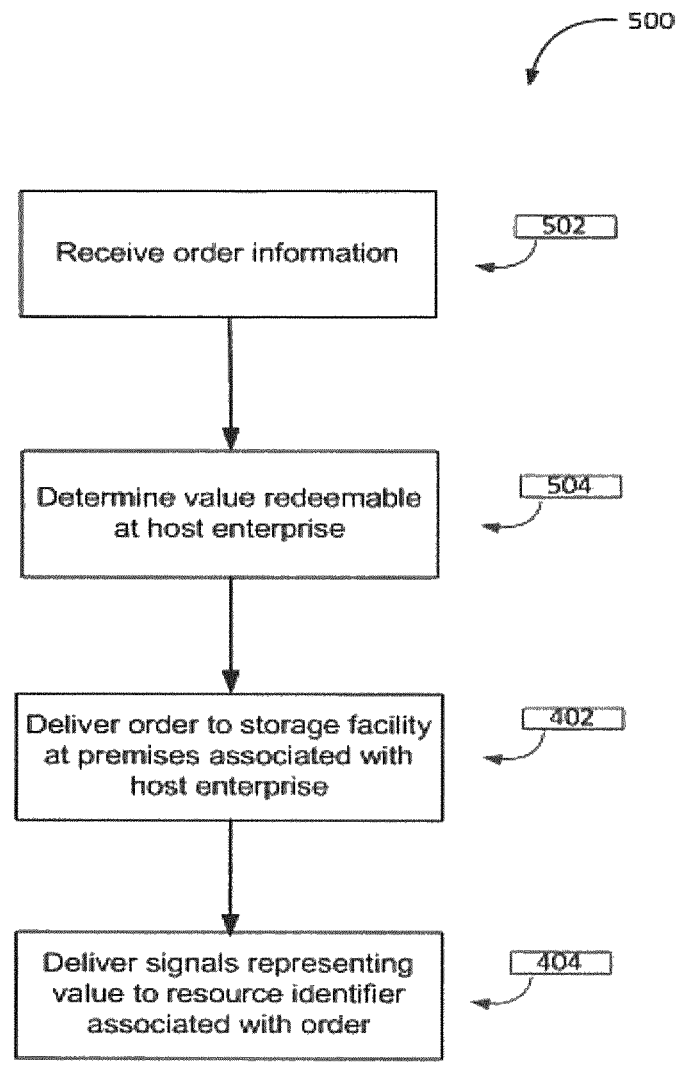

FIGS. 4A, 4B, and 5 are schematic diagrams showing process flows associated with embodiments of methods 400, 400', 500 of operating storage facilities for the delivery of goods in accordance with the invention.

In an embodiment such as that shown in FIG. 4A, a process can 400 begin with delivery at 402 to a storage facility 140 of goods or other items associated with an order placed by a customer or other user by means of a client device 120, as shown for example in FIG. 1.

For example, a user of an online grocery order system can use a desktop computer or mobile device 120, such as a tablet computer or smart phone, to access a grocery merchant's website, or other order-processing interface associated with an order processing system or device 110, and place an order for any desired number of item(s) by selecting such item(s) from a menu and optionally making use of payment mechanism(s) offered by the merchant, or making arrangements for payment at the point of pickup, using for example devices 32, 34, 36 at the secure storage facility.

Still at 402, at a suitable point during or after a process 502 (FIG. 5) of receiving order information and any desired payment and/or payment information, order processing system(s) 110 can initiate delivery of ordered goods or items to one or more storage facility(ies) 140. For example, system(s) 110 can cause, as for example through generation and/or other processing of suitably-configured signals, one or more fully- or semi-automated order fulfillment systems 130 to pick and assemble ordered items and facilitate delivery, as for example by means of physical transport, to one or more storage facilities 140 as shown at 168 in FIG. 1, and placement of the goods into suitable secure compartments 5, 6, 7, etc. shown in FIGS. 2 and 3.

As will be understood by those skilled in the relevant arts, premises suitable for use in implementing the invention may be of a very wide variety of types and forms. For example, corner—or other conveniently-located gas stations, transit stops or depots, coffee shops, park-and-ride facilities, sports or entertainment venues, etc., can be used to great advantage. In general, any location(s) that might be convenient for pedestrian, automotive, transit, or users of online or other remote-ordering and/or local delivery services will serve.

At 404, 504, order processing device(s) 110, either on its own authority and/or by means of real-time negotiation or communication with, or prior authorization by, a host and/or third-party enterprise system 150, such as an owner of the premises at which the storage facility(ies) 140 are located, the same or another merchant located at or near the point of pickup at the secure storage facility(ies) 140, a rewards or loyalty program administrator located remotely from the facility(ies), or other merchant or provider of value, can generate and deliver signals representing value redeemable or otherwise available to the ordering customer, another person or entity designated by such customer, or any other desired party.

Value determined at 504 and represented by signals delivered at 404 may be of any type or types consistent with the purposes contemplated herein, and thus may be of any of a very wide variety of types or forms.

For example, signals generated by processor(s) 110 and delivered at 402 can represent, or be suitable for generating, printed and/or virtual coupons or other printable indicia of discounts or other value, which indicia may be printable on demand or instruction for a customer or other user at a printer 36 of a facility 140 (FIG. 3); displayable on a user's mobile device, in for example the form of a human-readable image or text, a quick-response (QR) or bar code for reading by a vendor device at, for example, a point of sale (POS); etc. Alternatively, or in addition, signals representing such value may be processed by order processing server(s) 110, host server(s) 150, or any third party server(s), such as server(s) administered by or on behalf of one or more rewards or loyalty program administrators, in order to add value to a stored-value account on behalf of the ordering customer, his/her designee, and/or any other desired individual or entity.

As a further alternative, such signals may be used by order fulfillment system(s) 130 responsible for assembling orders to generate coupons, packing slips, stickers, or other printed or durable indicia, including for example passive near-field communications (NFC) chips, to be placed or otherwise associated with an assembled order and delivered to the ordering customer via storage facility(ies) 140. For example, a printed coupon or other durable physical indicia might be placed within, or adhered or otherwise attached to, a box, bag, or other delivery container, for retrieval and use by an ordering customer upon or after receipt.

As will be understood by those skilled in the relevant arts, signals representing value can be delivered, at 404, by routing them, using suitably-configured data processing and communications equipment, including for example suitably-configured network communications systems and components, to desired recipients through the use of suitably-configured resource identifiers, such as network addresses. Such addresses can, for example, include uniform resource locators (URLs) and other identifiers. In some examples, signals representing value can be delivered to an electronic account such as an email address, to a mobile device by text or data message, to an account on a mobile device application or web-enabled application, etc.

Thus, for example, such value may be provided in the form of one or more coupons or other forms of discount(s), rewards or loyalty points, etc., and may be redeemable by the ordering customer or other individual or entity at a particular location, such as a specific franchise, shopping mall, or particular store.

In some presently-preferred embodiments of the invention, value represented by signals delivered at 404 may be redeemable for all or other quantities of goods, services, or other items provided by or otherwise available at a premises at which the delivery facility(ies) 140 are located. For example, if the facility(ies) 140 are located at a gas station, dessert counter, coffee shop, or bottle store, such value may be redeemable presently, and/or at any desired future time, for gasoline, motor oil, and/or other petroleum and/or automotive products, for alcoholic beverages, quick-order desserts, coffee, hotdogs, or other treats, etc., provided by the facility(ies) host.

In some examples, the generation of signals for value can be based on data stored in a database 118, or data from the order fulfillment system 130, the storage facility system 140, the host enterprise system 150, client device(s) 120, order processing device(s) 110 or anywhere in the system 100.

In some examples, signals for value such as coupons or promotions can be previously defined and stored in a database 118 or elsewhere in the system. When multiple coupons or other signals for value are available, the order processing device(s) can be configured to select one or more of the coupons or other signals of value for delivery. In some examples, the selection may be random, performed in sequence or may be matched based on information associated with the order, the customer, and/or the host enterprise. In some examples, the host enterprise system may update the signals for value which are available for selection.

In some examples, the selection of the signals for value may include generating redemption details for the signals for value such as a type of discount, size or product associated with the a discount may be based on these same or other factors.

In some examples, the signals for value may be selected based on the value of the order, the value of the customer to the first enterprise (e.g. frequent or high spending customer), the time of the order, the time the order is picked up, the location of the host enterprise, etc. In some examples, the value of the signals for value may be proportional to the value of the order. In some examples, the signals for value may be selected based on previous signals for value which have already been presented to the customer, or based on signals for value which the customer has previously redeemed.

In some examples, the signals for value may be selected by determining a level of business of the host enterprise, for example, by accessing recent or historical information from the host enterprise system.

Where the facility(ies) host is a franchise or is associated with additional locations, in some examples, the signals for value may be redeemable at any location associated with the host.

The signals for value may be based on delivery options selected by the customer. For example, the order processing device(s) 110 may be configured to select/generate signals of value having higher values, if the customer selects delivery to a locker location which is/will be less full than another locker location which is/will be near capacity (i.e. more of the lockers are/will be holding orders). In some examples, this may be dependent on whether the selected locker location is further from a home or work address associated with the customer.

In some examples, the value of the signals of value may be higher if the customer picks up the order shortly after it is delivered or within a defined time window or threshold period. In some examples, the value of the signals of value may be higher if the customer picks up the locker at a historically less busy time of day/week.

In any of these examples, the factors affecting the value of the signals of value may be communicated to the customer to encourage desired pickup selection or behaviour. For example, the factors or value(s) may be displayed beside different pickup options, or a decreasing value amount may be displayed on a client device as the amount of time that the order has been ready for pickup increases.

In some examples, the signals of value may generated/selected such that they are redeemable within a defined time period of the order, or within a defined time period of the pickup. For example, a short time period may encourage customers to patronize the host business immediately before or after picking up their order. In other examples, the signals for value may be generated with an expiry date or no expiry date which may permit a customer to redeem them on a subsequent visit.

In some examples, the value of the signals of value may be contributed by both the first enterprise and the second enterprise. For example, the first enterprise may generate signals of value having a value of X, and the second enterprise may have an additional promotion (such as an introductory offer for a new product) which increases the value of the signals of value to 3X (i.e. the second enterprise contributes 2X to the value of the signals).

Any combination and weighting of the different factors for determining a value of the signals representing value described herein or otherwise may also be used.

As previously noted, and as will be understood by those skilled in the relevant arts, value represented by signals generated and/or delivered at 404 can be provided in any way(s) consistent with the disclosure herein. For example, in many embodiments methods in accordance with the invention can comprise realization 406 by the first enterprise, directly or indirectly, from the second enterprise, of consideration, such as reduced lease payments, reciprocal value awards to customers, and/or other promotions, for delivery to the resource identifier of the signals representing value redeemable by the second enterprise.

Among the many advantages offered by providing for such a wide range and types of value and redemption, the many possible embodiments of the invention can be used in a wide variety of ways to encourage owners, operators, and other holders or administrators of suitable premises to permit vendors, including for example on-line vendors such as grocers, who wish to implement facility(ies) 140 to provide them on their premises. Thus, for example, improvements in the efficiency of goods distribution, customer convenience, and a wide range of other social mechanisms can be achieved, with resultant improvements in energy consumption and other efficiencies.

In the embodiment shown in FIG. 4B, a process can 400 accomplishes a similar result by implementing process steps such as those described above in a varied order. As will be appreciated by those skilled in the relevant arts, the steps of various embodiments of a process 400 can be implemented in a very wide variety of sequences. Except to the extent inherent in the processes, or as otherwise required in any general or specific contexts, the invention is not meant to be limited to any particular sequence(s): any sequence which will accomplish the purposes contemplated herein will serve.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

As will be appreciated by those skilled in the relevant arts, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method of operating a storage facility for the delivery of goods, the method comprising:
   receiving, from a remote computing device, an order of goods for delivery to a secure storage facility;
   generating, by one or more processing devices of a first enterprise, a plurality of signals for controlling robotic devices to perform: (A) an automated picking of items for the order of goods, (B) an automated assembling of the picked items into a delivery container, and (C) for transport of the delivery container to the secure storage facility;

controlling the robotic devices to perform (A) through (C) based on the generated signals;

generating, by the one or more processing devices of the first enterprise, electronically readable indicia for physical attachment to the delivery container, the indicia being encoded with at least one of the plurality of generated signals having a redeemable value which is associated with the order of goods wherein the redeemable value of the at least one generated signal is redeemable at a second enterprise;

delivering the delivery container by physical transport to the secure storage facility associated with the first enterprise, the secure storage facility being located at a premise associated with the second enterprise;

selecting redemption signals from the plurality of generated signals, the selected redemption signals being associated with the redeemable value associated with the order of goods, wherein a first redemption signal includes a first redeemable value from the first enterprise, and a second redemption signal includes a second redeemable value from the second enterprise;

generating redemption details for at least one of the selected redemption signals, the redemption details including a total redeemable value and at least one of information identifying a redemption type and product information associated with a redemption; and delivering, over a communication network, the selected redemption signals to computing device of a customer, the selected redemption signals including the redemption details to an electronic resource identifier associated with the order of goods, wherein the total redeemable value is a combination and weighting of the first and second redeemable values and is a multiple of at least one of the first and second redeemable values;

receiving, over the communication network by the one or more processing devices of the first enterprise, a time when the order of goods is picked-up from the storage location associated with the second enterprise;

adjusting, by the one or more processing devices of the first enterprise, the total redeemable value when the pick-up time is outside a predetermined pickup period: and deliver, over the communication network by the one or more processing devices of the first enterprise, the adjusted total redeemable value to the remote computing device.

2. The method of claim 1, comprising:
delivering, by the first enterprise to the electronic resource identifier, at least one of reduced lease payment, reciprocal value awards, and promotions redeemable by the second enterprise.

3. The method of claim 1, wherein the redeemable value of the at least one of the plurality of generated signals is a coupon to be delivered in association with the goods delivered to the secure storage facility.

4. The method of claim 3, wherein at least one of the plurality of generated signals includes instructions to include the coupon in packaging associated with the order.

5. The method of claim 3, wherein at least one of the plurality of generated signals includes instructions for printing the coupon related to the order.

6. The method of claim 5, wherein at least one of the plurality of generated signals includes instructions to pick the coupon during an order picking process.

7. The method of claim 5, wherein at least one of the plurality of generated signals includes instructions to print the coupon and include the printed coupon when depositing the order to the storage location.

8. The method of claim 3, comprising using a printer associated with the secure storage facility to print the coupon.

9. The method of claim 3, wherein at least one of the plurality of generated signals initiates transmitting an electronic message to a recipient of the order, the electronic message including the coupon.

10. The method of claim 3, wherein at least one of the plurality of generated signals initiates generating signals for associating the coupon with payment information associated with the order.

11. The method of claim 3, wherein the storage location comprises part of an automated locker, and at least one of the plurality of generated signals initiates displaying a coupon code associated with the coupon at the secure storage facility.

12. The method of claim 3, wherein the storage location comprises part of an automated locker, and the at least one of the plurality of generated signals includes the coupon to be delivered to a recipient of the goods delivered to the automated locker.

13. The method of claim 3, wherein the coupon is at least one of: time limited; for items associated with ordered items; for any location associated with the second enterprise; and for a specific order location.

14. A system of operating a storage facility for the delivery of goods, the system comprising:
a secure storage facility associated with a first enterprise and located at a premises associated with a second enterprise, the secure storage facility being configured to receive goods associated with an order of goods placed with the first enterprise; and at least one processor configured to:
receive, from a remote computing device, the order of goods for delivery to the secure storage facility;

generate a plurality of signals for controlling robotic devices to perform: (A) an automated picking of items for the order of goods, (B) an automated assembling of the picked items into a delivery container, and (C) transport of the delivery container to the secure storage facility;

controlling the robotic devices to perform (A) through (C) based on the generated signals;

generate electronically readable indicia for physical attachment to the delivery container prior to transport to the secure storage facility, the indicia being encoded with at least one of the plurality of generated signals having a redeemable value which is associated with the order of goods, wherein the redeemable value of the at least one generated signal is redeemable at a second enterprise;

select redemption signals from the plurality of generated signals, the selected redemption signals being associated with the redeemable value associated with the order of goods, wherein a first redemption signal includes a first redeemable value from the first enterprise, based on an attribute of the order, and a second redemption signal includes a second redeemable value from the second enterprise, generate redemption details for at least one of the selected redemption signals, the redemption details including a total redeemable value and at least one of information identifying a redemption type and product information associated with a redemption,
deliver, over a communication network, the selected redemption signals to the remote computing device, the selected redemption signals including the redemption details to an electronic resource identifier associated with the order of goods, wherein the total redeemable value is a combination and weighting of the first and second redeemable values and is a multiple of at least one of the first and second redeemable values,
receive, over the communication network, a time when the order of goods is picked-up from the storage location associated with the second enterprise;
adjust the total redeemable value when the pick-up time is outside a predetermined pickup period; and
deliver the adjusted total redeemable value to the remote computing device.

15. The method of claim 1, wherein the at least one processor selects at least one of the redemption signals based on information associated with a customer.

16. The method of claim 15, wherein the information associated with the customer includes at least one of delivery options selected by the customer, and one or more previous redemptions by the customer.

17. The method of claim 1, wherein the redemption details includes information associated with the order which identifies at least one of a value of the order, a time when the order is placed, and a time when the order is picked up.

18. The method of claim 1, wherein the redemption details includes information associated with the second enterprise which identifies at least one of a location of the second enterprise, a level of business of the second enterprise, a total capacity of the second enterprise, and a level of usage of the total capacity.

* * * * *